(12) United States Patent
Kerep et al.

(10) Patent No.: US 10,717,237 B2
(45) Date of Patent: Jul. 21, 2020

(54) STRAPPING ADHESIVE TAPE

(71) Applicant: TESA SE, Hamburg (DE)

(72) Inventors: Patrick Kerep, Hamburg (DE);
Christian Krause, Rosengarten (DE);
Reinhard Storbeck, Hamburg (DE);
Jian Yang-Voss, Hamburg (DE)

(73) Assignee: TESA SE, Norderstedt (DE)

( * ) Notice: Subject to any disclaimer, the term of this patent is extended or adjusted under 35 U.S.C. 154(b) by 712 days.

(21) Appl. No.: 14/423,317

(22) PCT Filed: Aug. 13, 2013

(86) PCT No.: PCT/EP2013/066903
§ 371 (c)(1),
(2) Date: Jun. 16, 2015

(87) PCT Pub. No.: WO2014/029664
PCT Pub. Date: Feb. 27, 2014

(65) Prior Publication Data
US 2015/0291855 A1    Oct. 15, 2015

(30) Foreign Application Priority Data
Aug. 24, 2012    (DE) .......... 10 2012 215 133

(51) Int. Cl.
*C09J 7/24* (2018.01)
*C09J 7/38* (2018.01)
(Continued)

(52) U.S. Cl.
CPC ............ *B29C 65/48* (2013.01); *C09J 5/00* (2013.01); *C09J 7/243* (2018.01); *C09J 7/383* (2018.01); *B29L 2031/34* (2013.01); *B29L 2031/7162* (2013.01); *B29L 2031/762* (2013.01); *C09J 201/00* (2013.01); *C09J 2205/114* (2013.01); *C09J 2453/006* (2013.01)

(58) Field of Classification Search
None
See application file for complete search history.

(56) References Cited

U.S. PATENT DOCUMENTS

| 6,565,703 | B2 | 5/2003 | Wenninger et al. |
| 2011/0020629 | A1* | 1/2011 | Mussig ................. B29C 55/06 428/299.1 |
| 2011/0236702 | A1 | 9/2011 | Busch et al. |

FOREIGN PATENT DOCUMENTS

| DE | 2845541 A1 | 6/1980 |
| DE | 4313008 C1 | 11/1994 |
| (Continued) | | |

OTHER PUBLICATIONS

German Search report dated May 22, 2013.
International Search Report for PCT/EP2013/066903 dated Dec. 5, 2013.

*Primary Examiner* — Kelly M Gambetta
(74) *Attorney, Agent, or Firm* — Norris McLaughlin, P.A.

(57) ABSTRACT

The invention relates to an adhesive tape carrier made of a film, onto at least one side of which film an adhesive material is applied, wherein the film is a monoaxially stretched film made of polypropylene which contains at least 80 percent by weight polypropylene which has been processed in advance at least once, preferably has been extruded at least once, wherein the film has a stretching ratio during stretching in the longitudinal direction of 1:4 to 1:10.

13 Claims, 1 Drawing Sheet

(51) Int. Cl.
*C09J 5/00* (2006.01)
*C09J 201/00* (2006.01)
*B29C 65/48* (2006.01)
*B29L 31/34* (2006.01)
*B29L 31/00* (2006.01)

(56) References Cited

FOREIGN PATENT DOCUMENTS

| | | | |
|---|---|---|---|
| DE | 196 43 239 A1 | 4/1998 | |
| DE | 102006062249 A1 | 6/2008 | |
| EP | 1211297 A2 | 6/2002 | |
| EP | 1336683 A1 | 8/2003 | |
| WO | 0210304 A1 | 2/2002 | |
| WO | 2008077883 A3 | 7/2008 | |
| WO | WO-2010023606 A1 * | 3/2010 | ......... B29C 47/0021 |

\* cited by examiner

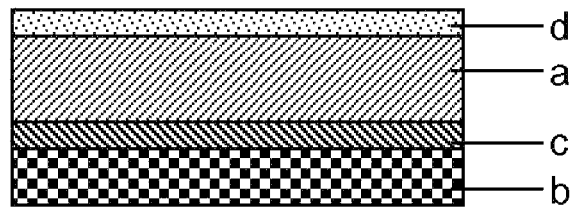

STRAPPING ADHESIVE TAPE

This application is a 371 of International Patent Application No. PCT/EP2013/066903, filed Aug. 13, 2013, which claims priority of German Patent Application No. 10 2012 215 133.8, filed Aug. 24, 2012, the entire contents of which patent applications are incorporated herein by reference.

The invention relates to an adhesive strapping tape.

Adhesive strapping tapes are suitable particularly for bundling articles. Examples of such articles include pipes, profiles, or stacked cardboard boxes (strapping application). The strapping applications further include the fastening of moving parts on white goods (such as refrigerators and freezers or air-conditioning units), on red goods such as (gas) ovens, and, generally, on electrical equipment such as printers, for example.

In the technical jargon, the sectors are designated as follows:
  Appliance Sector: fastening of moving parts of refrigerators and freezers and other household appliances such as gas ovens, etc.
  Office Automation Sector: fastening of moving parts of printers, copiers, etc.

The residueless removability (redetachability) of a strapping tape from a variety of substrates is dependent essentially on the peel forces which develop, after different periods of time, when the tape is detached from the substrates in question. Ideally, the peel force, in comparison to the initial force, increases only slightly or even not at all, since with increasing peel force there is an increase in the risk either of the carrier tearing or of residues remaining. Hence, in the case of forces that are too high, the film carrier may fail and tear and/or split. Other results of excessively high peel forces may be either the cohesive splitting of the adhesive or else the transfer of the adhesive as a result of detachment from the carrier.

In all cases, unwanted residues of the adhesive tape are produced on the substrate, whether in the form of parts of the tape itself or of parts of the adhesive.

There is, consequently, a need for an adhesive strapping tape which can be employed universally across all substrates relevant to the application, examples being the plastics ABS, PS, PP, PE, PC, and POM, and also various metals, and solventborne, waterborne, and powder-applied coatings and other solvent-free coatings (for example, UV-curing coatings), this tape at the same time bonding securely to these substrates, with sufficiently high bond strengths of, in general, at least 2.5 N/cm, yet nevertheless being removable without residue or damage even after prolonged storage at different temperatures (temperature range: −20° C. to +60° C.) and UV irradiation.

Although adhesive strapping tapes are utilized across a great variety of applications, they have certain key properties allowing them to meet the particular requirements to which they are subject. These properties—without making any claim to completeness—include very high tensile strength (ultimate tensile force), a very good stretch resistance, corresponding to a high modulus at low levels of elongation, and a low elongation at break, a sufficient but not excessive bond strength, a graduated bond strength to the tape's own reverse, residue-free redetachability after the stresses of the application itself, robustness of the carrier with respect to mechanical load, and also, for certain applications, the resistance of the adhesive tape toward UV irradiation and to numerous chemicals.

Whereas some of the properties can be attributed to the adhesive or to other functional layers of the adhesive tape, the stretchability and the tensile strength are based substantially on the physical properties of the carrier material used.

An adhesive tape intended to find use as a strapping tape ought to exhibit at least some, preferably as many as possible, more preferably all, of the following properties:
  The adhesive tape must secure loose parts during transit; that is, the adhesive tape ought to have a high tear resistance and sufficient bond strength.
  The adhesive tape must not stretch greatly under load; that is, the adhesive tape ought to have high F1-F10% values (high values for the tensile strength at 1% and 10% elongation), or a high modulus of elasticity.
  The adhesive tape must function under a variety of climatic conditions; that is, the adhesive tape ought to have climatic resistance in the temperature range between −20° C. to 40° C. and a relative humidity of up to 95%.
  The adhesive tape ought to be repeelable without residue and without cohesive fracture from a variety of substrates in the temperature range between −20° C. to 40° C. and at a relative humidity of up to 95%.
  The adhesive tape ought to be heat-resistant during the drying of the coating of adhesive in the operation of manufacturing the adhesive tape.
  The adhesive tape ought to be easy to use; that is, the adhesive tape ought preferably to have a low unwind force, this being ensurable in particular via the use of a carbamate or silicone release.
  The adhesive tape ought to bond well to a variety of substrates, and have sufficient cohesion to secure the goods under transit; that is, the adhesive tape may have an adhesive based on natural rubber, SIS rubber, or acrylate.

The prior art encompasses numerous adhesive tapes which are used in the strapping (bundling) and appliance (transit securement of movable parts such as drawers, shelves, flaps, particularly in household appliances, etc.) sectors and in the furniture industry.

There are primarily three different films employed as carrier materials for adhesive strapping tapes:
  i) biaxially oriented PET films having a thickness of between 30 and 60 µm
  ii) monoaxially oriented PE and PP films having a thickness of between 40 and 150 µm
  iii) filament-reinforced BOPP and PET films, the reinforcement used comprising monofilaments and cross-filaments of glass or PET.

From the materials referred to above, MOPP has established itself as a carrier material, particularly in the appliance sector, on account of the ideal cost/benefit balance. In comparison to BOPP, MOPP is more expensive, but offers significantly better mechanical properties. Conversely, filament-reinforced adhesive tapes are usually much more expensive and in relation to that cost offer only moderately improved performance.

MOPP (polypropylene drawn monoaxially) is produced from certain PP or PP/PE copolymer grades via extrusion and subsequent stretching. The material used here must ideally have a suitable melt index (MFI) between 0.5 to 2, since the material otherwise can subsequently no longer be stretched sufficiently.

Commonly, during the production of MOPP films, a marginal edge trim is carried out, in which the margins are taken off and passed back into the extrusion process. The proportion of this (recyclable) trimming is around 5%.

Besides the mechanical requirements to be met, other aspects are nowadays gaining an increasing role.

Because of environmental aspects, sustainability, and against the background of ever scarcer resources of petroleum and, on the other hand, a sharp growth in worldwide consumption of plastics, there have been efforts for some years to recycle plastics and thereby to return them to the production process, and also, consequently, to promote the use of such recycled plastics.

This approach is reducing the amount of waste and therefore, in a welcome manner, relieving the burden on the environment.

Discernible in the state of the art are first approaches of recycling, for example, polypropylene in film production.

US 2011/0236702 A1, for example, specifies a process which uses recycled biaxial polypropylene to form new films. There is, however, a clear statement to the effect that the proportion of recycled polypropylene must not be too high, since otherwise the properties of the film no longer satisfy the requirements imposed.

In the past, the proportion of recycled material in the mixture for extrusion has been kept low.

Because of the high mechanical stresses through shearing and the long exposure to heat which extrusion entails (the usual residence times during extrusion are up to 180 seconds), the skilled person was bound to expect degradation of the polymers, accompanied, logically, by deterioration in the mechanical properties.

The skilled person was aware that degradation gives rise to a very wide variety of oxidation products and that it is accompanied by deleterious changes to chain length and polydispersity.

This supposition is also confirmed by the prior art, as evident, for example, from the articles "Degradation of Polyethylene During Extrusion. II. Degradation of Low-Density Polyethylene, Linear Low-Density Polyethylene, and High-Density Polyethylene in Film Extrusion" (Journal of Applied Polymer Science, Vol. 91, 1525 to 1537 (2004)© 2003 Wiley Periodicals, Inc.) or "Measurement of the degradation of polypropylene" (Journal of Plastics Technology [Zeitschrift Kunststofftechnik] 8 (2012) 4).

It is an object of the invention to provide an adhesive tape which has all of the necessary mechanical properties to be able to find use in particular as an adhesive strapping tape and which at the same time satisfies the rising requirements for environmentally benign production.

This object is achieved by means of an adhesive tape as characterized in more detail in the main claim. The dependent claims describe advantageous embodiments of the invention. Additionally encompassed is the use of the adhesive tape of the invention.

The invention relates accordingly to an adhesive tape having a carrier comprising a film applied on at least one side of which is an adhesive, the film being a monoaxially drawn film of polypropylene, including at least 80 wt % of polypropylene which beforehand has been processed at least once, preferably extruded at least once, the film having a draw ratio on drawing in the longitudinal direction of 1:4 to 1:10.

The polypropylene is preferably recycled between one and five times. This means that the polypropylene processed at least once, which has preferably been extruded, is supplied again to the production process. This procedure may be repeated preferably up to five times; in other words, the optionally multiply processed polypropylene is supplied five times to the production process for producing new films.

It is advantageous if the polypropylene is only recycled once or up to two times.

According to one preferred embodiment of the invention, the proportion in the film of polypropylene processed at least once, preferably extruded at least once, is at least 85 wt %, more preferably 90 wt %, very preferably 95 wt %, and very, very preferably 100 wt %.

The polypropylene material which has been extruded at least once before comprises, for example, the aforementioned edge trimmings arising during the production of polypropylene films. Instead of unenvironmentally and unecomically disposing of these trimmings, they are utilized in accordance with the invention for production of new polypropylene films.

The draw ratio on drawing of the extruded primary film in the longitudinal direction (machine direction) is preferably 1:5 to 1:9, more preferably 1:6 to 1:7.5, very preferably 1:6 to 1:6.5. A 1:6 draw ratio indicates that, from a section of film with a length of 1 m, for example, a section of drawn film 6 m in length is produced. The draw ratio is often identified as the quotient formed from the linear speed prior to stretching and the linear speed after stretching. The numerical figures used hereinafter relate to drawing. Drawing takes place without any substantial decrease in the width of the primary film, solely at the expense of the thickness of the film.

As a result of the machine direction stretching, polypropylene films having the maximum tensile strengths and moduli can be obtained. The very high stretch resistance of exclusively monoaxially oriented polypropylene films is one of the most key properties for their use as adhesive strapping tape carriers. In many applications such as the securement of carton stacks, the bundling either of heavy articles, or else the fixing of ends under tension of metal sheets coiled up in the form of rolls, to name but a few examples, this property is vital.

The principle of operation of orientation lies in the alignment of the polymer molecule chains and of the crystal structures they form, and also in the alignment of the amorphous regions into defined preferential directions and the associated increase in strength.

The enormously high tensile strength of such carriers is used profitably for the envisaged applications. For example, in machine direction, maximum loads of more than 350 N/mm$^2$ (see, for example, in DE 10 2006 062 249 A1) are held.

The carrier film preferably has no rib structures on the surfaces, since such structures impair adhesion during the drawing operation and do not allow homogeneous stretching. If the film is of multilayer construction through coextrusion, then, in accordance with one preferred embodiment of the invention, it also has no rib structures in the interior, but instead has layers in plane-parallel alignment, so that there is no need to provide a costly and complicated die that is susceptible to faults.

The carrier preferably consists of exactly one film ply (in addition to the auxiliary layers yet to be described, such as primer or release).

Besides the polypropylene layer of the invention, however, the carrier may have one or two or further film plies.

These further film plies need not consist of recycled material. In line with the environmental thinking it is preferred if they too consist of recycled polymers.

The film of the adhesive tape of the invention is obtained by extrusion and stretching in the longitudinal direction, using customary methods which are general knowledge.

The polypropylene polymer which is used is used preferably as pellets.

The polypropylene may be a pure polypropylene—that is, it may be constructed only of propylene monomers. Also suitable are random polypropylene copolymers or polypropylene block copolymers.

Suitable comonomers in this case are olefins, especially ethylene and/or butene. The term "copolymer" here is to be understood in the sense that it includes terpolymers. The proportion of the comonomers in the polypropylene is below 50 wt %, preferably below 30 wt %, more preferably below 15 wt %, with particular preference below 10 wt %.

In accordance with the invention, polypropylene also comprehends a blend of a polypropylene and at least one other polymer. The proportion of the polymer or polymers, according to one preferred embodiment, is below 15 wt %, preferably below 10 wt %, more preferably below 5 wt %.

A particular further polymer used is polyethylene.

The melt indices of the polypropylene polymers for recycling preferably lie within the range suitable for flat film extrusion. This range ought to be between 0.3 and 10 g/10 min, preferably in the range of 0.5 and 2 g/10 min, preferably in the range of 0.5 and 3 g/10 min, more preferably in the range of 0.5 and 5 g/10 min (measured at 230° C./2.16 kg).

In particularly advantageous embodiments of the invention, the melt indices are up to 5 g/10 min. Also possible, however, are variants in which the melt indices are between 5 g/10 min and 10 g/10 min.

As carrier for the adhesive tape it is possible to use the films described directly, with in general the side for subsequent coating with the adhesive being given a fluorine or plasma treatment or a corona or else flame pretreatment, in order to anchor the adhesive more effectively on the carrier.

A further improvement in the adhesion synonymous with the anchoring of the adhesive on the carrier (or as an alternative treatment) can be accomplished through the use of primers. With these it is possible, on the one hand, to tailor the surface energy usefully and, on the other hand, when using isocyanate-containing primers, for example, to pursue chemical attachment of the elastomeric adhesive component to the carrier.

The customary coatweight of the primer per unit area is between 0.1 and 10 g/m$^2$. A further possibility for improving anchoring lies in the use of carrier films which by means of coextrusion are furnished specifically with a polymer surface favorable for attachment to the pressure-sensitive adhesive.

Descriptions of the adhesives customarily used for adhesive tapes, and also of release varnishes and primers, are found, for example, in the "Handbook of Pressure Sensitive Adhesive Technology" by Donatas Satas (van Nostrand, 1989).

The adhesive applied to the carrier material is preferably a pressure-sensitive adhesive, this being an adhesive which permits a durable bond to virtually all substrates even under relatively weak applied pressure and which, after use, can be detached from the substrate again substantially without residue. A pressure-sensitive adhesive exerts permanent tack at room temperature, thus having a sufficiently low viscosity and a high initial tack, meaning that it wets the surface of the respective bond base even under low applied pressure. The bondability of the adhesive derives from its adhesive properties, and the redetachability from its cohesive properties.

To produce an adhesive tape from the carrier, any known adhesive systems may be employed. In addition to the preferred adhesives based on natural rubber or synthetic rubber, it is possible to use silicone adhesives and also polyacrylate adhesives, preferably a low molecular mass acrylate hotmelt pressure-sensitive adhesive.

The adhesive used is preferably one which consists of the group of the natural rubbers or of any desired blend of natural rubbers and/or synthetic rubbers, the proportion of synthetic rubber in the blend, according to one preferred variant, being at most as great as the proportion of the natural rubber.

Rubber adhesives display a good combination of bond strength, tack and cohesion and also balanced adhesion performance on virtually all relevant substrates, and are therefore predestined. General information on rubber adhesives can be found in other standard works for adhesive tapes, such as, for example, the "Handbook of Pressure Sensitive Adhesive Technology" by Donatas Satas.

The natural rubber or natural rubbers may be selected in principle from all available qualities such as, for example, crepe, RSS, ADS, TSR, or CV grades, according to the required level of purity and of viscosity, and the synthetic rubber or synthetic rubbers may be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), and polyurethanes, and/or blends thereof.

Furthermore, preferably, in order to enhance their processing qualities, the rubbers may be admixed with thermoplastic elastomers, with a weight proportion of 10 to 50 wt %, based on the overall elastomer fraction.

Representatives that may be mentioned at this point include in particular the especially compatible styrene-isoprene-styrene (SIS) and styrene-butadiene-styrene (SBS) grades. Suitable elastomers for blending are also, for example, EPDM or EPM rubber, polyisobutylene, butyl rubber, ethylene-vinyl acetate, hydrogenated block copolymers of dienes (for example, by hydrogenation of SBR, cSBR, BAN, NBR, SBS, SIS, or IR; such polymers are known, for example, as SEPS and SEBS) or acrylate copolymers such as ACM.

In addition, a 100% system of styrene-isoprene-styrene (SIS) has proven suitable.

Crosslinking is advantageous for improving the repeelability of the adhesive tape after application, and may be accomplished thermally or by irradiation with UV light or electron beams.

For the purpose of thermally induced chemical crosslinking it is possible to use all known thermally activatable chemical crosslinkers such as accelerated sulfur systems or sulfur donor systems, isocyanate systems, reactive melamine-, formaldehyde-, and (optionally halogenated) phenol-formaldehyde resins and/or reactive phenolic resin or diisocyanate crosslinking systems with the corresponding activators, epoxidized polyester resins and acrylate resins, and also combinations thereof.

The crosslinkers are preferably activated at temperatures above 50° C., more particularly at temperatures from 100° C. to 160° C., very preferably at temperatures from 110° C. to 140° C.

Thermal excitation of the crosslinkers may also take place via IR rays or high-energy alternating fields.

Use may be made of solventborne, water-based or hotmelt-system adhesives. An acrylate hotmelt-based adhesive is suitable as well, and may have a K value of at least 20, more particularly greater than 30, obtainable by concentrating a solution of such an adhesive to form a system which can be processed as a hotmelt.

The concentrating may take place in appropriately equipped vessels or extruders; a devolatilizing extrudate is preferred, especially for the associated devolatilization.

An adhesive of this kind is set out in DE 43 13 008 A1, the content of which is hereby referenced and made part of the present disclosure and invention.

The acrylate hotmelt-based adhesive, however, may also be crosslinked chemically.

In a further embodiment, self-adhesives used are copolymers of (meth)acrylic acid and esters thereof having 1 to 25 C atoms, maleic, fumaric and/or itaconic acid and/or their esters, substituted (meth)acrylamides, maleic anhydride and other vinyl compounds, such as vinyl esters, more particularly vinyl acetate, vinyl alcohols and/or vinyl ethers.

The residual solvent content ought to be below 1 wt %.

An adhesive which has likewise shown itself to be suitable is a low molecular mass, pressure-sensitive acrylate hotmelt adhesive of the kind carried by BASF under the designation acResin UV or Acronal®, especially Acronal® DS 3458. This low-K-value adhesive acquires its application-compatible properties by virtue of a concluding chemical crosslinking operation initiated by radiation.

Lastly it may be mentioned that polyurethane-based or polyolefin-based adhesives are suitable as well.

For the purpose of optimizing the properties, the self-adhesive employed may have been blended with tackifiers (resins) and/or with one or more adjuvants such as plasticizers, fillers, pigments, UV absorbers, light stabilizers, aging inhibitors, crosslinking agents, crosslinking promoters, or elastomers.

Tackifiers are, for example, especially hydrogenated and nonhydrogenated hydrocarbon resins (composed of unsaturated $C_5$ or $C_7$ monomers, for example), terpene-phenolic resins, terpene resins from raw materials such as α- or β-pinene and/or δ-limonene, aromatic resins such as indene-coumarone resins, or resins of styrene or α-methylstyrene, such as rosin and its derivatives, such as disproportionated, dimerized, or esterified resins, in which case glycols, glycerol, or pentaerythritol may be used. Particularly suitable are aging-stable resins without an olefinic double bond, such as hydrogenated resins, for example.

Express reference may be made to the depiction of the state of knowledge in the "Handbook of Pressure Sensitive Adhesive Technology" by Donatas Satas (van Nostrand, 1989).

Suitable fillers and pigments are, for example, fibers, carbon black, zinc oxide, titanium dioxide, solid microbeads, solid or hollow glass beads, silica, silicates, chalk, calcium carbonate and/or zinc carbonate.

Suitable aging inhibitors (antiozonants, antioxidants, light stabilizers, etc.) for the adhesives are primary antioxidants such as sterically hindered phenols, for example, secondary antioxidants such as phosphites or thiosynergists (thioethers), for example, and/or light stabilizers such as UV absorbers or sterically hindered amines, for example.

Suitable plasticizers are, for example, aliphatic, cycloaliphatic, and aromatic mineral oils, diesters or polyesters of phthalic acid, trimellitic acid, or adipic acid, liquid rubbers (for example, nitrile rubbers or polyisoprene rubbers), liquid polymers of butene and/or isobutene, acrylic esters, polyvinyl ethers, liquid resins and plasticizing resins based on the raw materials for tackifier resins, wool wax and other waxes, or liquid silicones.

Crosslinking agents are, for example, phenolic resins or halogenated phenolic resins, melamine resins and formaldehyde resins. Suitable crosslinking promoters are, for example, maleimides, allyl esters such as triallyl cyanurate, and polyfunctional esters of acrylic and methacrylic acids.

The substances recited are in turn not mandatory; the adhesive also functions without their addition individually or in any combination, in other words without resins and/or residual adjuvants.

The coating thickness with adhesive is preferably in the range from 1 to 100 $g/m^2$, more particularly 10 to 50 $g/m^2$, more preferably in the range from 15 to 35 $g/m^2$.

The pressure-sensitive adhesives may be produced and processed from solution, dispersion, and from the melt. Preferred production and processing methods are from solution or dispersion.

The pressure-sensitive adhesives thus produced may then be applied to the carrier using the methods that are general knowledge. In the case of processings from the melt, these may be application methods involving a die or a calender.

In the case of methods from solution, known coating operations are with doctor blades, knives, or nozzles, to mention but a few.

For the purposes of this invention, the general expression "adhesive tape" encompasses all sheetlike structures, such as two-dimensionally extended films or film sections, tapes with extended length and limited width, tape sections and the like, and also, lastly, diecuts or labels.

The adhesive tape may be produced in the form of a roll, in other words in the form of an Archimedean spiral wound up onto itself, or else with lining on the adhesive side using release materials such as siliconized paper or siliconized film.

Suitable release material preferably comprises a nonlinting material such as a polymeric film or a well-sized, long-fiber paper.

The adhesive tapes have running lengths in particular of 1000 to 30 000 m. Roll widths selected are typically 10, 15, 19, 25, and 30 mm.

The reverse face of the adhesive tape may have had a reverse-face varnish applied to it, in order to exert a favorable influence over the unwind properties of the adhesive tape wound to form an Archimedean spiral. For this purpose, this reverse-face varnish may have been equipped with silicone or fluorosilicone compounds and also with polyvinylstearylcarbamate, polyethyleneiminestearylcarbamide, or organofluorine compounds as substances with adhesive (antiadhesive) effect.

Suitable release agents include surfactant-based release systems based on long-chain alkyl groups such as stearyl sulfosuccinates or stearyl sulfosuccinamates, but also polymers, which may be selected from the group consisting of polyvinylstearyl-carbamates, polyethyleneiminestearylcarbamides, chromium complexes of $C_{14}$ to $C_{28}$ fatty acids, and stearyl copolymers, as described in DE 28 45 541 A, for example. Likewise suitable are release agents based on acrylic polymers with perfluorinated alkyl groups, silicones or fluorosilicone compounds, for example based on poly (dimethylsiloxanes). With particular preference the release layer comprises a silicone-based polymer. Particularly preferred examples of such silicone-based polymers with release effect include polyurethane-modified and/or polyurea-modified silicones, preferably organopolysiloxane/polyurea/polyurethane block copolymers, more preferably those as described in example 19 of EP 1 336 683 B1, very preferably anionically stabilized polyurethane-modified and urea-modified silicones having a silicone weight fraction of 70% and an acid number of 30 mg KOH/g. An effect of using polyurethane-modified and/or urea-modified silicones is that the products of the invention combine optimized aging resistance and universal writability with an optimized release behavior. In one preferred embodiment of the invention, the release layer comprises 10 to 20 wt %, more preferably 13 to 18 wt %, of the release-effect constituent.

Adhesive tapes of the invention are used preferably in widths of 9 to 150 mm, more particularly 19 to 50 mm, and in that case have a preferred thickness of 70 to 300 μm, preferably 75 to 120 μm.

The invention further encompasses a method for producing the adhesive tapes, comprising the following steps:
  melting polypropylene including at least 80 wt % of polypropylene which has been processed at least once before, preferably having been extruded
  extruding the polypropylene melt to form a film
  monoaxially drawing the film with a draw ratio in the longitudinal direction of 1:4 to 1:10
  coating the film with a pressure-sensitive adhesive

BRIEF DESCRIPTION OF THE DRAWING

FIG. 1 shows a typical construction of the adhesive tape of the invention.

The product consists of a film (a) and an adhesive (b). Additionally there may also be a primer (c) used, for improving the adhesion between adhesive and carrier, and a reverse-face release (d) may be used as well.

The carrier (a) consists of a monoaxially oriented polypropylene film having a preferred thickness of between 30 and 170 μm.

The adhesive (b) is a mixture of natural rubber or other elastomers and also various resins, and may optionally also include plasticizers, fillers, and aging inhibitors.

It has surprisingly emerged that MOPP can be produced even with 100% recycled PP raw material, without significant change in the mechanical properties.

This is surprising because the expectation would have been that the mechanical stress would degrade the PP raw material, with consequent impairment in the quality of the extrudate and hence in the mechanical properties of the film. As in the examples shown below, the values for both films are situated at the same level.

The adhesive tape of the invention exhibits ready redetachability from a wide variety of substrates. On the other hand, however, redetachability exists even at plus temperatures, meaning that no residues are observed as a result of cohesive failure of the adhesive, no instances of adhesive transfer (poor adhesive anchoring), and no carrier splits are observed.

The carrier has a sufficient internal strength in all three directions in space, and has a high impact strength.

On the basis of the properties outlined, the adhesive tape can be employed outstandingly as an adhesive strapping tape for bundling and palletizing cardboard-boxed products and other goods, even at low temperatures.

Furthermore, the adhesive tape can be used for outstanding fastening of moving parts such as doors, flaps, and the like on printers or refrigerators during transport from the manufacturer to the seller, and on to the purchaser, even at low temperatures.

The adhesive tapes are redetachable without residue.

The invention is illustrated below by a number of examples, without thereby wishing to impose any restriction on the invention.

EXAMPLES

Raw Materials
Dow 7C06: polypropylene block copolymer:
MFI 1.5 g/10 min, non-nucleated, flexural modulus 1280 MPa, crystallite melting point 164° C. (Dow Chemical)

Inventive Example 1

The film is produced on a single-screw extrusion unit with flat die with flexible die lip in one layer, followed by a chill roll station and a single-stage short-gap drawing unit. Recycled film material (the film had originally been produced from Dow 7C06) is extruded, the die temperature being 230° C. Chill roll temperatures and drawing roll temperatures are set so as to maximize the crystallinity of the film before and after the drawing operation. The draw ratio is 1:6.5.

Film Properties (in Longitudinal Direction where Appropriate):

| Carrier thickness after drawing/μm | 87 |
| Stress at 1% strain/MPa | 24.7 |
| Stress at 10% strain/MPa | 141 |
| Tensile strength/MPa | 282 |
| Elongation at break/% | 37 |

Comparative Example 1

The film is produced on a single-screw extrusion unit with flat die with flexible die lip in one layer, followed by a chill roll station and a single-stage short-gap drawing unit. Dow 7C06 is extruded, the die temperature being 230° C. Chill roll temperatures and drawing roll temperatures are set so as to maximize the crystallinity of the film before and after the drawing operation. The draw ratio is 1:6.

Film Properties (in Longitudinal Direction where Appropriate):

| Carrier thickness after drawing/μm | 84 |
| Stress at 1% strain/MPa | 25.1 |
| Stress at 10% strain/MPa | 143 |
| Tensile strength/MPa | 287 |
| Elongation at break/% | 35 |

Test Methods

The measurements are carried out (unless otherwise indicated) under test conditions of 23±1° C. and 50±5% relative humidity.

Flexural Modulus

The test takes place according to ASTM D 790 A (secant modulus at 2% strain).

Crystallite Melting Point

The crystallite melting point is determined as usual according to ISO 3146 by DSC at a heating rate of 10 K/min.

Thickness

The thickness is measured according to DIN 53370.

Melt Index

The melt index is measured as Melt Flow Index (MFI) according to DIN 53735. For polyethylenes, melt indices are usually reported in g/10 min at 190° C. with a weight of 2.16 kg, and for polypropylenes correspondingly, but at a temperature of 230° C.

Tensile Elongation Behavior

The tensile elongation behavior is tested unless otherwise indicated in machine direction (MD, running direction). The tensile strength is expressed in MP and the elongation at break in %; both values are measured according to DIN 53455-7-5. The test results, particularly the elongation at break, should be made statistically reliable by means of a sufficient number of measurements.

The 1% or 10% strain is determined according to DIN 53455-7-5 in the longitudinal direction.

The invention claimed is:

1. A method of preparing an adhesive tape, said method comprising:
    (a) melting polypropylene including at least 80 wt % of polypropylene which has been processed at least once before, and optionally has been extruded, said melting resulting in polypropylene melt;
    (b) extruding the polypropylene melt to form a film;
    (c) monoaxially drawing the film with a draw ratio in the longitudinal direction of 1:4 to 1:10; and
    (d) coating the film with a pressure-sensitive adhesive;
    wherein the film after drawing exhibits at least one property that is not substantially changed compared to that exhibited by a comparison film prepared in the same manner except from 100 wt % virgin polypropylene, wherein the at least one property is selected from the group consisting of stress at 1% strain, stress at 10% strain, tensile strength, and elongation at break.

2. The method according to claim 1, wherein the polypropylene which has been processed at least once before has been extruded at least once before.

3. The method of claim 1,
wherein
a thickness of the film is between 20 and 2000 µm.

4. The method of claim 1,
wherein
the draw ratio on drawing in the longitudinal direction is 1:5 to 1:9.

5. The method of claim 1,
wherein
the pressure-sensitive adhesive is selected from the group consisting of natural rubbers, blends of natural rubbers, synthetic rubbers, and mixtures thereof.

6. The method of claim 1,
wherein
the pressure-sensitive adhesive comprises tackifier resins.

7. The method of claim 1,
wherein the pressure-sensitive adhesive comprises an additive selected from the group consisting of at least one UV protectant, other blending components, and mixtures thereof.

8. The method of claim 2,
wherein
a fraction in the film of polypropylene which has been extruded at least once is at least 85 wt %.

9. The method according to claim 1, wherein the polypropylene that is melted in (a) is composed 100% of polypropylene which has been processed at least once before, and optionally has been extruded.

10. The method according to claim 2, wherein the polypropylene that is melted in (a) is composed 100% of polypropylene which has been processed at least once before, and has been extruded at least once before.

11. The method according to claim 1, wherein the adhesive tape is an adhesive strapping tape.

12. The method according to claim 11, wherein the polypropylene is a polypropylene homopolymer or polypropylene/polyethylene copolymer having a melt index (MFI) between 0.5 to 2.

13. The method according to claim 12, wherein the polypropylene is a polypropylene block copolymer having MFI of 1.5 g/10 min, flexural modulus of 1280 MPa, and a crystallite melting point of 164° C.;
    wherein steps (b) and (c) are carried out on a single-screw extrusion unit with a flat die with flexible die lip in one layer, followed by a chill roll station, and a single-stage short-gap drawing unit;
    wherein said die operates at a temperature of 230° C.; and
    wherein said drawing unit draws the film in a draw ratio of 1:6.5.

* * * * *